Figure 1:
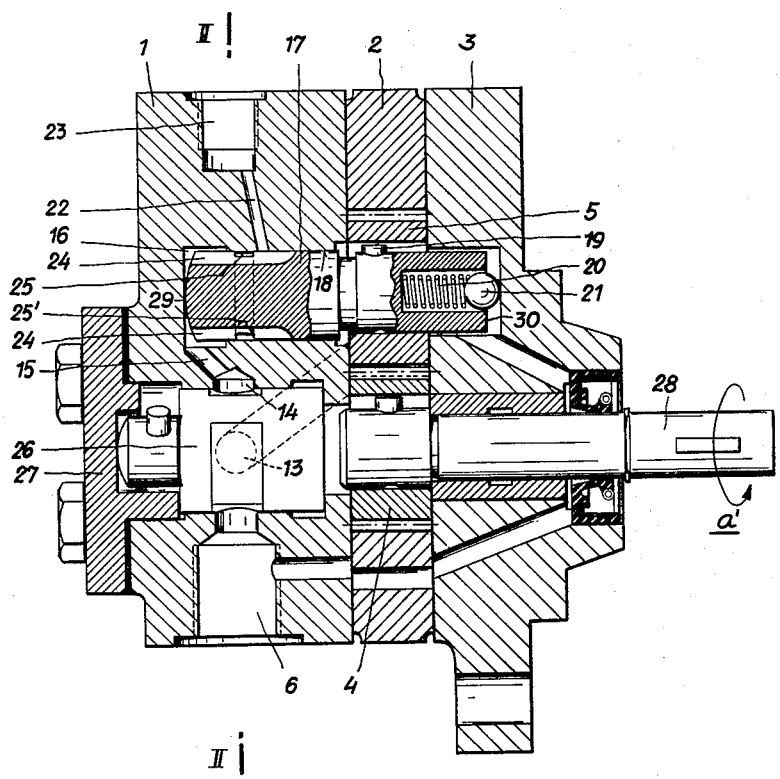

Nov. 15, 1960    J. LIPINSKI    2,960,112
DEVICE FOR THE DISTRIBUTION OF FLUIDS, PARTICULARLY
OF LUBRICANTS, TO DIFFERENT OUTLETS
Filed May 7, 1956    2 Sheets-Sheet 1

INVENTOR.
J. Lipinski
BY
Glasser Downing Seebold
ATTYS.

2,960,112
Patented Nov. 15, 1960

2,960,112

DEVICE FOR THE DISTRIBUTION OF FLUIDS, PARTICULARLY OF LUBRICANTS, TO DIFFERENT OUTLETS

Johann Lipinski, Pressbaum, near Vienna, Austria, assignor to Messrs. Alex. Friedmann Kommandit-Gesellschaft, Vienna, Austria Filed May 7, 1956, Ser. No. 583,285

Claims priority, application Austria Apr. 5, 1956

3 Claims. (Cl. 137—625.11)

The invention relates to a device for the quantitative distribution of fluids, such as particularly lubricants, to several outlets, which device comprises a gear pump and at least one distributing rotary valve arranged behind said pump in the direction of flow.

It is known to provide gear pumps with a distribution rotary valve for dividing the discharge of the pump to several outlets. It is difficult, however, to achieve a quantitative distribution. When the rotary valve closes one outlet port before it opens the next following one, considerable pressure surges are caused in the pressure chamber of the pump. These pressure surges damage the pump and cause undesired vibration. On the other hand, if the rotary valve opens one outlet opening in the valve face before it has closed the foregoing outlet opening, there is a period of overlap in which the pump discharges through two outlets in an uncontrolled manner. Within that period of overlap it will depend on the back pressures effective in the respective outlets through which outlet the larger quantity is discharged. For this reason a reasonably precise distribution of the discharge to the several outlets is not possible. It has been suggested already to feed the fluid pumped by the gear pump to a storage space, from which it passes to the distributing member. Such a storage space may have a certain sufficient action on the pressure surges but requires additional structural expenditure. It has also been suggested to relieve the pressure chamber by relief valves during the pressure surges but such relief valves involve an uncontrolled variation of the actually discharged quantity.

It is an object of the invention to eliminate said disadvantages. The invention resides essentially in that the distributing valve member is axially acted upon by the pressure of the fluid to be distributed and is arranged to be axially displaceable in the direction of pressure against a spring force. Thus an existing part, namely, the distributing rotary valve member, is used as a resiliently yielding piston and the yielding movement of the distributing rotary valve member reduces or compensates the pressure surges. The distributing rotary valve member is suitably formed by the shaft of one of the pump gears; this is known per se in gear pumps having a distributing rotary valve member. The shaft forming the distributing rotary valve member is connected to the pump gear so as to be axially displaceable but nonrotatable relative thereto.

According to a preferred embodiment of the invention the distributing rotary valve member has at least one peripherally extending control edge, e.g. an annular groove, which intersects its control recess or recesses and which opens at least part of the outlet openings in the valve face upon an axial displacement of the distributing rotary valve member. Thus any desired number of the outlet openings in the valve face or all of them are slightly opened during the yielding movement of the distributing rotary valve member and a throttled transfer of the fluid to be distributed is possible to the various outlet openings. When the gear pump is running at low speed, the distribution of the fluid is effected only through the control recesses of the distributing rotary valve member because the yielding movements of the valve member will be sufficient to compensate the pressure surges. On the other hand, when the gear pump is running at higher speed, the annular groove of the distributing rotary valve member will open the outlet bores. The inertia of the distributing rotary valve member will prevent a return thereof to its initial position between the several pressure surges. In that case the rotary valve member remains in a steady state or performs only small axial movements and the outlet openings in the valve face remain continually open to some extent due to the annular groove of the distributing rotary valve member. For this reason a slight throttled transfer of the fluid to be distributed to the several outlets will take place continuously when a certain speed is exceeded. Vibration is avoided because the distributing rotary valve member remains in a steady state in its yielding position. This will not vary the total quantity of the fluid to be distributed and it has been found that the quantitative distribution of the fluid to the several outlets appears also to be ensured with adequate precision. The device will automatically adapt to any alteration of the operating condition, e.g. of the speed or of the viscosity of the fluid handled because the resulting pressure change in the pressure chamber will cause a corresponding displacement of the distributing rotary valve member, whereby the outlets are opened to a larger or smaller extent. The distance of the peripherally extending control edge of the rotary valve member from the outlet openings in the valve face in the position of rest of the rotary valve member multiplied with the end face area of the rotary valve member displacement of the rotary valve member required to open the outlet openings should suitably exceed the volume discharged by the gear pump during the period in which the control recess of the rotary valve member passes from one outlet opening in the valve face to the following one, so that with low pressures in the pressure chamber of the gear pump or with low speed the peripherally extending control edge will not open the outlet openings and an increase in pressure or speed will increase the cross-sectional area of the outlet openings which is opened by the peripherally extending control edge. Since the different back pressures in the various outlet bores are the less effective the higher is the pressure in the pressure chamber, the larger cross-sectional area then opened will not adversely affect the distribution of the fluid to the several outlets. The stronger the throttling effect at the point of transfer from the annular groove to the several outlets, the less will the difference between the back pressures in the several outlets be effective on the rate at which fluid flows into said outlets. The throttling effect, however, increases with the axial spring load on the distributing rotary valve member. According to the invention, therefore, the spring force related to the unit of effective piston area of the distributing rotary valve member should exceed the highest back pressure, related to the same unit of area, which may occur in an outlet under normal conditions of operation. When the spring stress related to the unit of area theoretically assumed to be of infinite magnitude, even the greatest differences between the back pressure in the outlets will be unable to affect the exact equality of the discharge to the several outlets. In practice it is sufficient to take the highest back pressures into account which may be expected in operation and to select the spring stress biassing the distributing rotary valve so that the spring force related to the unit of effective piston area of the distributing rotary valve exceeds the highest outlet back pressure reduced to the same unit of area.

If the gear pump is mechanically driven, as is usual, the device according to the invention may also be utilized for generating the pressure of the fluid to be distributed and for distributing the same. It is also possible according to the invention to drive the device, like a hydraulically operated distributor, by the supply pressure of the fluid; that supply pressure may be generated by any desired source of pressure. In that case the gear pump forms according to the invention the hydraulic drive means for the distributing rotary valve member. Most of the known hydraulically driven distributors, particularly for lubricants, comprise a number of pistons which are acted upon and operated by the supply pressure of the fluid and which feed the fluid to be distributed, appropriate locking or control members being provided to determine the sequence of the movements of the pistons. Such known distributors require high precision in manufacture and are subject to a relatively high wear owing to the strong locking forces which become effective. The drive is effected by admission of pressure to reciprocating pistons. Such reciprocating pistons which admit the supply pressure alternately in one and the other direction tend to block, which causes the known bucking of the distributor. These disadvantages are avoided by the present invention because a rotary drive means, such as a gear pump, cannot buck. It is also possible to connect similar devices to the several outlets of such a device so that the quantity discharged into one outlet is again distributed to several outlets. Such series arrangements are usual and known with hydraulically driven distributors. The invention enables also the use of a mechanically driven device comprising a gear pump and a distributing rotary valve as a source of pressure for driving one or several hydraulically driven devices of the same kind. For instance, in a lubricating system one such device may be mechanically driven and may have connected to its several outlets similar devices consisting of a gear pump and a distributing rotary valve and driven only hydraulically to effect a second distribution of the lubricant fed and distributed by the mechanically driven device.

The invention is diagrammatically illustrated in the drawing with reference to an exemplary embodiment.

Figure 2:
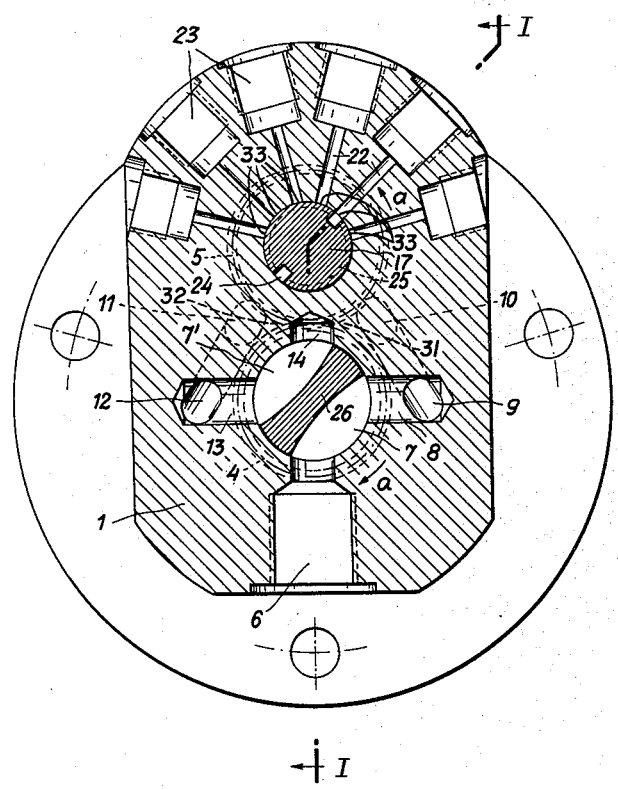

Figs. 1 and 2 show a device for feeding and distributing lubricants, which consists of a gear pump and a distributing rotary valve. Fig. 1 is a sectional view taken on line I—I of Fig. 2 and Fig. 2 is a sectional view taken on line II—II of Fig. 1.

The pump gears 4 and 5 are carried in a tripartite casing 1, 2, 3. 6 is the supply line connection. The lubricant flows from the connection 6 to a cylinder space 7 and farther through ducts 8, 9 and 10 into the chamber 31, not shown. The lubricant passes from the chamber 32 of the gear pump 4, 5 through ducts 11, 12, 13 into a cylinder space 7' and farther through a bore 14 and a pressure duct 15 into a space 16.

The end of a distributing rotary valve member 17 extends into the space 16 and is guided in a cylinder bore 18 forming the valve face. That distributing rotary valve member 17 forms at the same time the shaft of the pump gear 5 and is axially displaceably guided in the same but held against rotation by a key 19. The distributing rotary valve member has two end faces 29 and 30. A spring 20, which bears through the intermediary of a ball 21 on the casing part 3, tends to urge the distributing rotary valve member 17 to the left against the pressure of the lubricant in the space 16. In the bore 18 which represents the valve face, a number of control openings 33 are provided which are in communication with connection bores 23 over outlet bores 22. The distributing rotary valve member 17 is formed with axially extending grooves 24 which represent control recesses whereby the space 16 is connected in turn to the several control openings 33. Two grooves 24 are provided to relieve the distributing rotary valve member 17 from radial pressure and to permit of distributing the outlet bores 22 only over half the periphery of the valve face 18. Thus each outlet bore 22 is twice connected to the space 16 during one rotation of the distributing rotary valve member 17.

The grooves 24 are of such width that an outlet bore 22 will be opened only when the foregoing outlet bore 22 has been closed. During the period in which the valve is completely closed the pressure will build up in the space 16 to urge the distributing valve member 17 to the right against the force of the spring 20. The distributing valve member 17 is formed with an annular groove 25, having a control edge 25' which intersects the axial grooves 24. When the pressure built up in the space 16 causes the distributing rotary valve member 17 to move to the right, compressing the spring 20, that annular groove 25 will slightly open all outlet bores 22 so that a throttled transfer of the lubricant will be possible through all outlet bores 22. When rotating at low speed the distributing rotary valve member 17 will perform a yielding stroke to the right during each period in which the outlet bores 22 are completely closed. At higher speeds, however, the annular groove 25 of the distributing rotary valve member 17 will open the outlet bores 22 and the distributing rotary valve member 17 will remain steady in an intermediate position to permit of a throttled discharge of the lubricant through the annular groove 25 to the outlet bores 22. Thus, excessive pressure surges are avoided and vibration is minimized. The force of the spring 20 is determined so that it permits the pressure in the space 16 to build up to a value which exceeds the highest possible back pressure in one of the outlet bores 22. The stronger the spring 20, the less will be the effect of different back pressures in the several outlet bores 22 on the rate of the lubricant flowing through the annular groove 25 into said outlet bores. Only the edge 25' of that annular groove 25, extending peripherally of the distributing rotary valve member, acts as a control edge. For this reason the distributing rotary valve member may be reduced as far as to the control edge 25'.

A change-over cock 26 may be arranged in the cylinder space 7, 7' to reverse the direction of discharge of the gear pump 4, 5 upon a reversal of the drive. If the pump runs in the direction indicated by arrows a' and the change-over cock 26 is in the position shown the duct 10 will be connected to the supply line connection 6 and the duct 11 will be connected to the bore 14 and pressure duct 15, through which the lubricant flows to the space 16. As long as the change-over cock 26 remains in the position shown in Fig. 2 the chamber 31 is the suction chamber of the pump and the chamber 32 is the pressure chamber of the pump. When the change-over cock 26 is turned through 90 degrees the supply line connection 6 is connected to the duct 11 and chamber 32 and the chamber 31 and duct 10 is connected to the bore 14 and pressure duct 15 and thus to the space 16. Therefore the chamber 32 will be the suction chamber and the chamber 31 will be the pressure chamber of the pump as soon as the change-over cock 26 is turned through 90 degrees out of the position shown in Fig. 2. In this way the device can be adapted to a reversal of the sense of rotation. After the cover 27 has been removed the change-over cock 26 is accessible for adjustment. For simplicity the gears 5 and 4 are represented as one-part members.

In the device shown in Figs. 1 and 2 the gear pump may be driven mechanically by means of the shaft 28 of the gear 4.

In that case the device acts both as a source of pressure and as a distributor.

The same device can be used as a hydraulically driven lubricant distributor. In that case the connection 6 is supplied with lubricant under the pressure of an external source of pressure and the pump gears 4, 5 act as a drive means for the distributing rotary valve member 17. A shorter shaft may in that case be inserted instead of the shaft 28 or the shaft 23 may be allowed to idle.

What I claim is:

1. In a distributor valve for the quantitative distribution of liquids, a casing, several outlets in the said casing to which the liquids are to be distributed, said casing having a bore and a distributing rotary valve member inserted in said bore slidable in its axial direction, the said valve member having two end faces, a pressure duct in the said casing, means defining a space in the said bore at one end face of the said valve member connected to the said pressure duct, spring means pressing the said rotary valve member towards the said space to rest therein, said rotary valve member being axially acted upon by the pressure of the liquid to be distributed, contained in the said space against the force of the said spring means, the bore having end orifices connected to the said several outlets, said rotary valve member having at least one control recess extending longitudinally on the outer surface of the rotary valve member and being always in communication with the said space in the said bore and registering successively with the said end orifices, said rotary valve member also having at least one peripherally extending control edge intersecting the said control recess and being formed by an annular recess so positioned on the outer surface of the said rotary valve member that when said rotary valve member is in its rest position in response to said spring means, said annular recess is out of communication with the outlet orifices and in a manner that when the said rotary valve member is pressed to its rest position by the said spring, the said outlet orifices are successively fed only via the said control recess, the said control edge sliding over at least part of each of the said end orifices when the said rotary valve member is axially displaced a sufficient distance against the force of the said spring means.

2. A device as claimed in claim 1, wherein the distance of the said peripherally extending control edge of the rotary valve member from the said outlet openings, when the rotary valve member is pressed by the said spring means in its rest position multiplied with the area of the said end face of the rotary valve member exceeds the volume discharged during the period in which the control recess of the rotary valve member moves from one outlet opening in the said bore to the next following one, so that with low pressures in the pressure duct the peripherally extending control edge will not open the outlet openings and an increase in pressure or speed will increase the cross-sectional area of the outlet openings which is opened by the peripherally extending control edge.

3. In a device as claimed in claim 1, wherein the force of the said spring means related to the unit area of the said end face of the distributing rotary valve member exceeds the maximum back pressure related to the same unit area, which may occur in an outlet under normal conditions of operation.

References Cited in the file of this patent

UNITED STATES PATENTS

| | | |
|---|---|---|
| 2,060,220 | Kennedy | Nov. 10, 1936 |
| 2,110,428 | Simonds | Mar. 8, 1938 |
| 2,157,285 | Egersdorfer | May 9, 1939 |
| 2,161,507 | Egersdorfer | June 6, 1939 |
| 2,210,144 | Day | Aug. 6, 1940 |
| 2,223,590 | Alden | Dec. 3, 1940 |
| 2,531,861 | Schmitt | Nov. 28, 1950 |
| 2,664,910 | Boyd et al. | Jan. 5, 1954 |
| 2,685,254 | Muller | Aug. 3, 1954 |
| 2,700,984 | Gleasman | Feb. 1, 1955 |
| 2,750,933 | Lauck | June 19, 1956 |
| 2,771,844 | Lipinski | Nov. 27, 1956 |
| 2,895,420 | Hess | July 21, 1959 |

FOREIGN PATENTS

| | | |
|---|---|---|
| 868,915 | France | Oct. 20, 1941 |